(12) United States Patent
Wiethoff et al.

(10) Patent No.: US 10,479,024 B2
(45) Date of Patent: Nov. 19, 2019

(54) DEVICE FOR SETTING A SETTING ELEMENT IN A COMPONENT

(71) Applicant: WEBER SCHRAUBAUTOMATEN GmbH, Wolfratshausen (DE)

(72) Inventors: Ralf Wiethoff, Wolfratshausen (DE); Jochen Hartmann, Lenggries (DE)

(73) Assignee: Weber Schraubautomaten GmbH (DE)

( * ) Notice: Subject to any disclaimer, the term of this patent is extended or adjusted under 35 U.S.C. 154(b) by 384 days.

(21) Appl. No.: 15/305,771

(22) PCT Filed: Apr. 13, 2015

(86) PCT No.: PCT/EP2015/057992
§ 371 (c)(1),
(2) Date: Oct. 21, 2016

(87) PCT Pub. No.: WO2015/162029
PCT Pub. Date: Oct. 29, 2015

(65) Prior Publication Data
US 2017/0043525 A1      Feb. 16, 2017

(30) Foreign Application Priority Data
Apr. 23, 2014   (DE) ........................ 10 2014 105 702

(51) Int. Cl.
*B29C 65/06* (2006.01)
*B29C 65/60* (2006.01)
(Continued)

(52) U.S. Cl.
CPC ........ *B29C 65/0672* (2013.01); *B29C 65/069* (2013.01); *B29C 65/608* (2013.01);
(Continued)

(58) Field of Classification Search
CPC . B29C 65/0672; B29C 65/085; B29C 65/087; B23K 20/12
See application file for complete search history.

(56) References Cited

U.S. PATENT DOCUMENTS

| 3,819,339 | A | 6/1974 | Takagi et al. |
| 5,983,599 | A | 11/1999 | Krueger |

(Continued)

FOREIGN PATENT DOCUMENTS

| DE | 2165236 A | 7/1972 |
| DE | 4141616 A1 | 6/1993 |

(Continued)

OTHER PUBLICATIONS

Machine translation for DE4317621 (Year: 1994).*

(Continued)

*Primary Examiner* — Scott W Dodds

(57) ABSTRACT

The invention relates to a device for setting a setting element having a first plastic material in a component having a second plastic material, comprising a rotational advancing unit, by means of which the setting element can be rotated about an axis of rotation and simultaneously an axial force acting in the direction of the axis of rotation can be applied to the setting element in order to drive the setting element into the component, a friction welding joint thereby being produced between the setting element and the component, a differential-distance measuring apparatus for measuring the differential distance between a surface of the component and a surface of the driven setting element, and a control unit for controlling the rotational advancing unit in dependence on the measured differential distance.

11 Claims, 6 Drawing Sheets

Figure 1A:
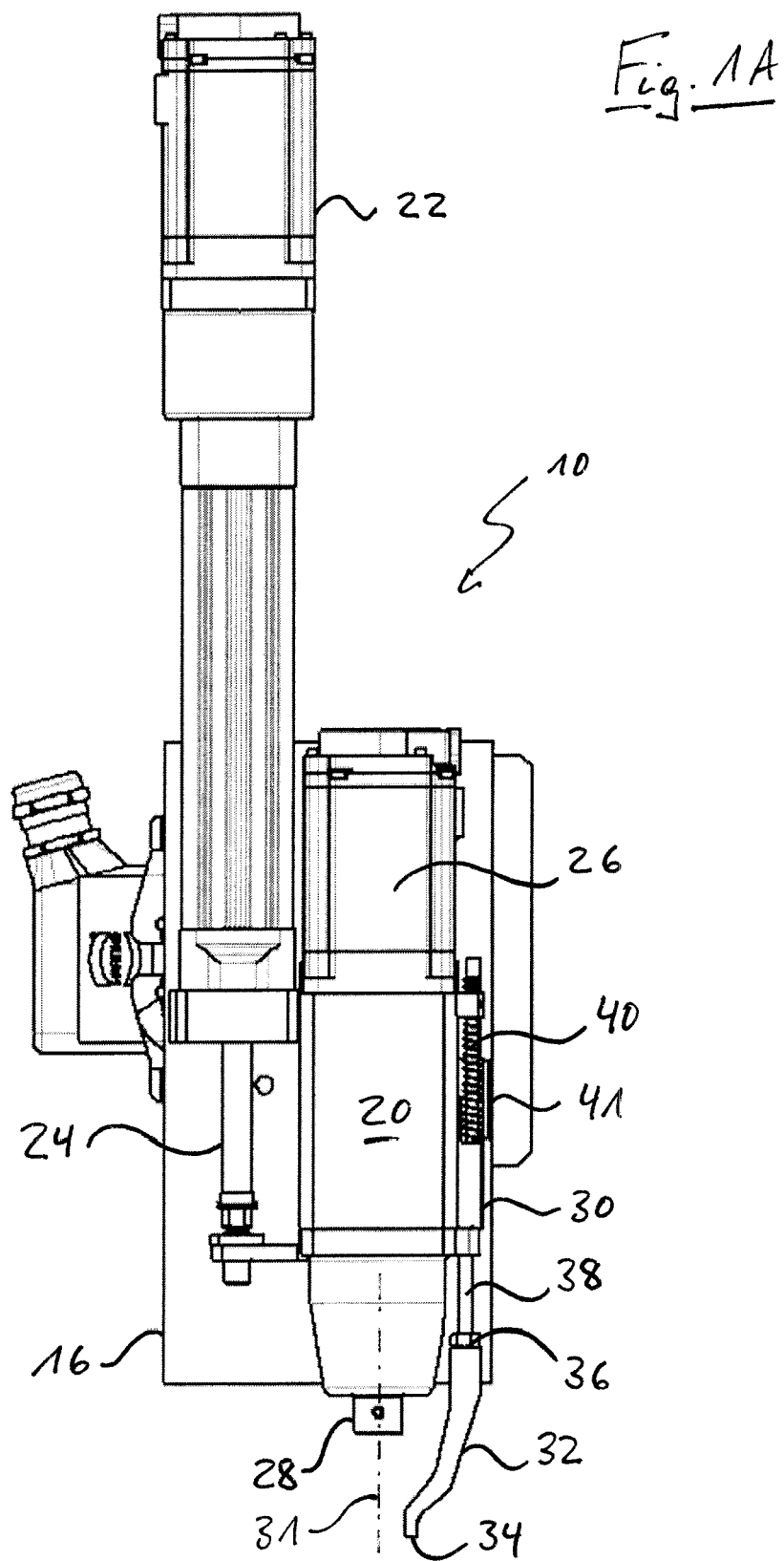

(51) Int. Cl.
*B29C 65/00* (2006.01)
*F16B 5/01* (2006.01)
*B29C 65/74* (2006.01)
*F16B 19/02* (2006.01)
*B29C 65/64* (2006.01)

(52) U.S. Cl.
CPC ...... *B29C 65/7437* (2013.01); *B29C 66/1122* (2013.01); *B29C 66/30325* (2013.01); *B29C 66/32* (2013.01); *B29C 66/322* (2013.01); *B29C 66/474* (2013.01); *B29C 66/721* (2013.01); *B29C 66/7254* (2013.01); *B29C 66/72525* (2013.01); *B29C 66/73116* (2013.01); *B29C 66/742* (2013.01); *B29C 66/7465* (2013.01); *B29C 66/7487* (2013.01); *B29C 66/8322* (2013.01); *B29C 66/9261* (2013.01); *B29C 66/92311* (2013.01); *B29C 66/92615* (2013.01); *F16B 5/01* (2013.01); *F16B 19/02* (2013.01); *B29C 65/645* (2013.01); *B29C 66/863* (2013.01); *B29C 66/9221* (2013.01)

(56) References Cited

U.S. PATENT DOCUMENTS

| | | | |
|---|---|---|---|
| 6,153,035 A * | 11/2000 | Van Laeken | B29C 65/0672 156/309.6 |
| 6,170,731 B1 | 1/2001 | Hofius, Sr. et al. | |
| 7,279,055 B2 | 10/2007 | Schuler | |
| 7,882,981 B2 | 2/2011 | Auriol et al. | |
| 8,752,603 B2 | 6/2014 | Christ et al. | |
| 2003/0028281 A1 | 2/2003 | Adams et al. | |
| 2008/0093420 A1* | 4/2008 | Mauer | B23K 20/12 228/114 |

FOREIGN PATENT DOCUMENTS

| | | |
|---|---|---|
| DE | 4317621 C1 | 6/1994 |
| DE | 102004013836 A1 | 10/2005 |
| DE | 102009038697 A1 | 3/2011 |
| EP | 0780581 A1 | 6/1997 |
| EP | 1577076 A2 | 9/2005 |
| JP | H02248236 A | 10/1990 |
| JP | H1016054 A | 1/1998 |
| JP | H1016055 A | 1/1998 |
| JP | H1016056 A | 1/1998 |
| JP | 2003211549 A | 7/2003 |
| JP | 2005022379 A | 1/2005 |
| JP | 2006167918 A | 6/2006 |
| JP | 2006516009 A | 6/2006 |

OTHER PUBLICATIONS

Communication received from the Patent Office in China for related Chinese Application No. 2018041601733850; dated Apr. 19, 2018; 7 pages.

Communication received from the Patent Office in Japan for related JP Application No. 2017-507065; dated Nov. 13, 2018; 5 pgs.

English Translation of International Preliminary Report on Patentability for International Application No. PCT/EP2015/057992 dated Oct. 25, 2016, 7 pages.

English Translation of International Search Report of the International Searching Authority for International Application No. PCT/EP2015/057992 dated Jul. 23, 2015, 2 pages.

English Translation of the Written Opinion of the International Searching Authority for International Application No. PCT/EP2015/057992 dated Sep. 2, 2016, 6 pages.

International Preliminary Report on Patentability for International Application No. PCT/EP2015/057992 dated Oct. 25, 2016, 6 pages.

International Search Report of the International Searching Authority for International Application No. PCT/EP2015/057992 dated Jul. 23, 2015, 3 pages.

Search Report issued by the German Patent Office dated Nov. 6, 2014 for German Patent Application No. 10 2014 105 702.3, 8 pages.

Written Opinion of the International Searching Authority for International Application No. PCT/EP2015/057992 dated Oct. 25, 2015, 5 pages.

* cited by examiner

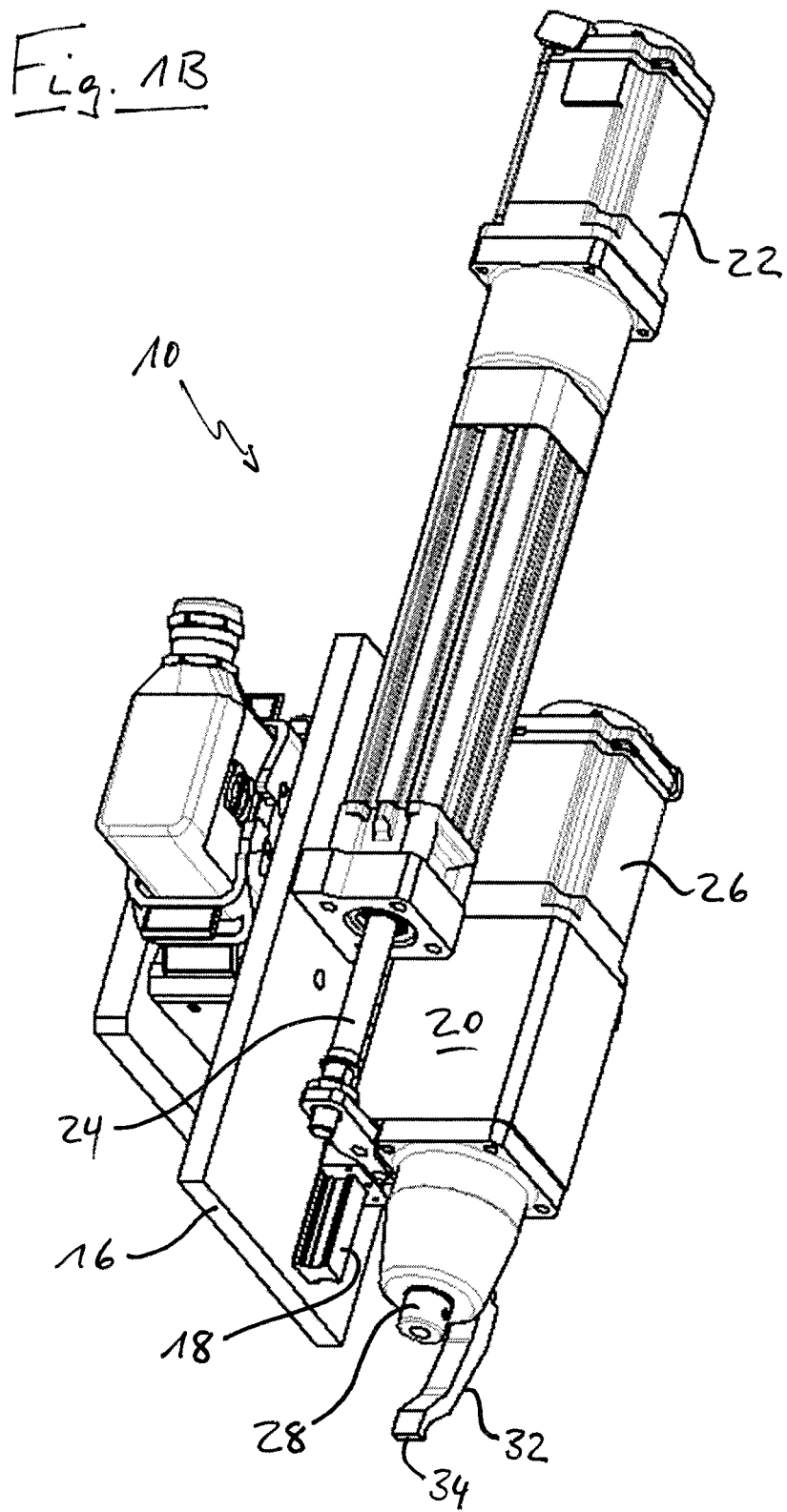

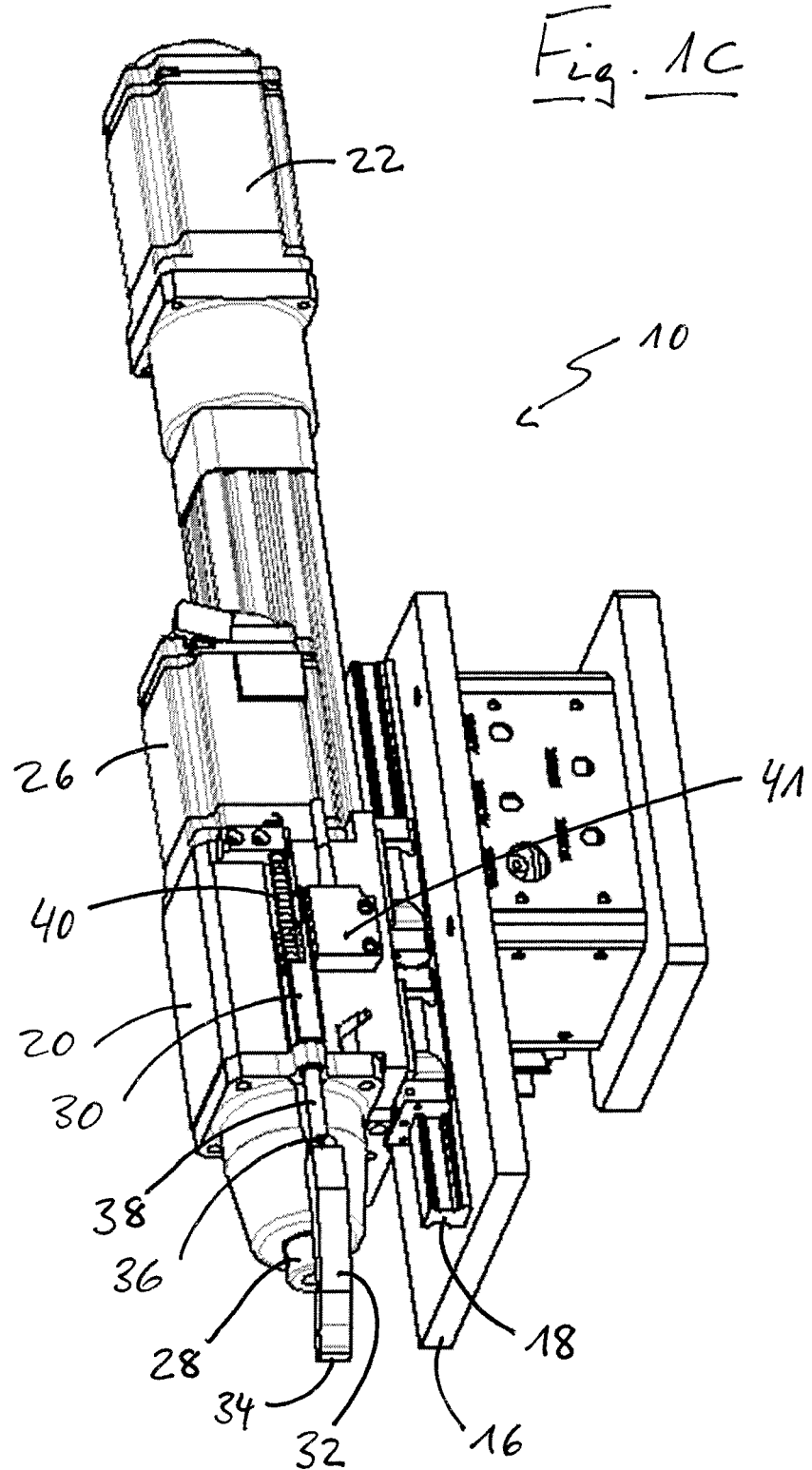

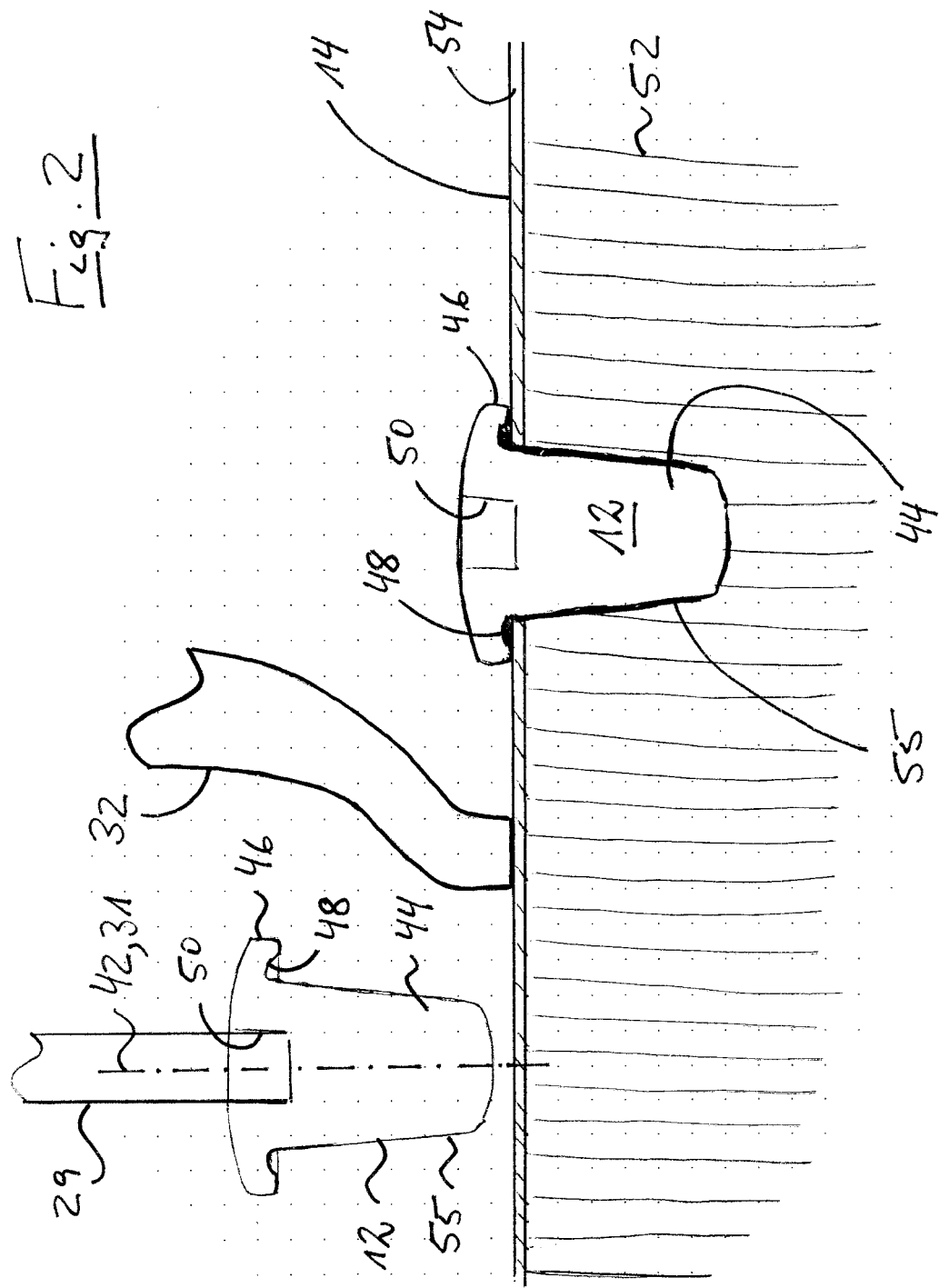

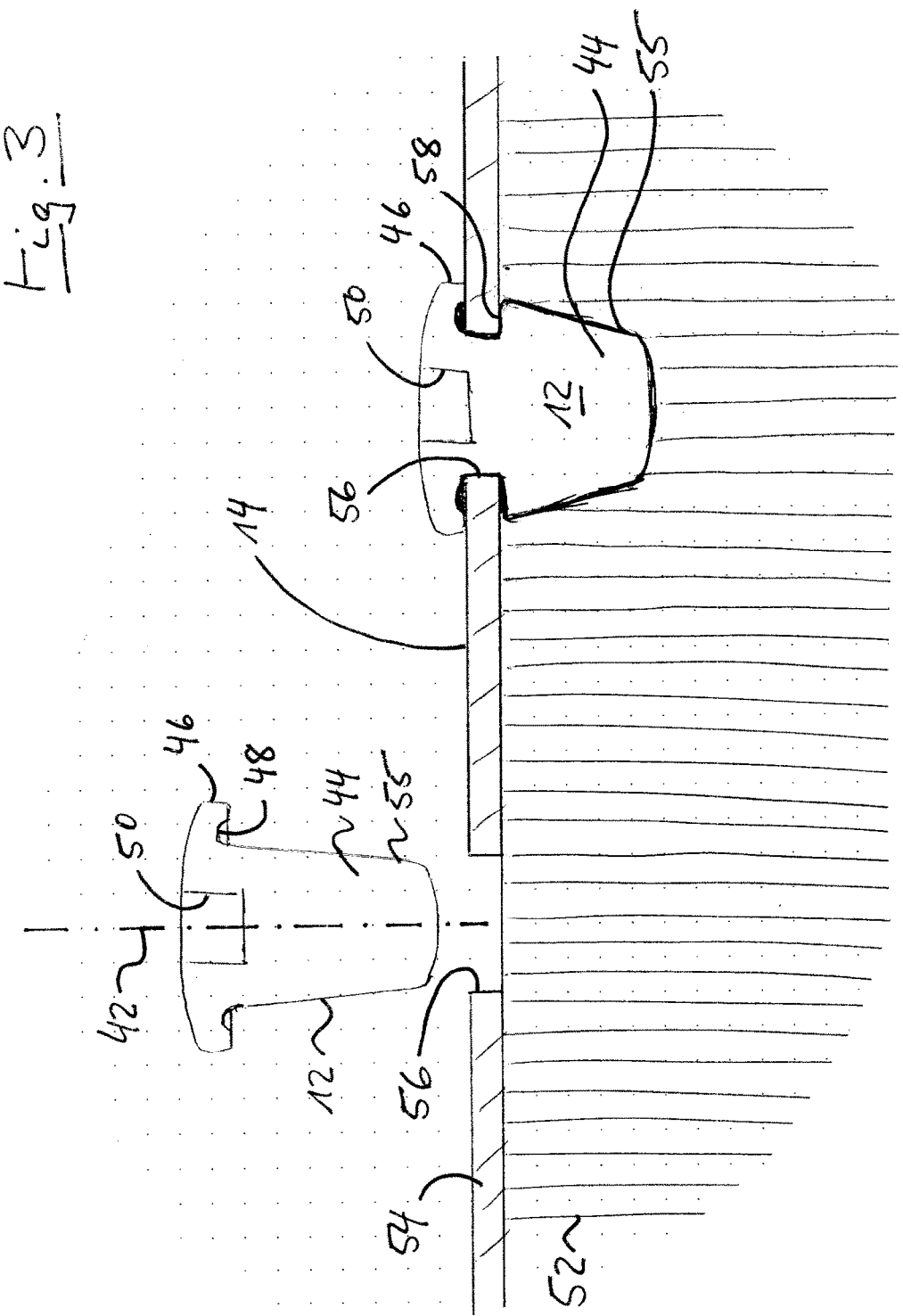

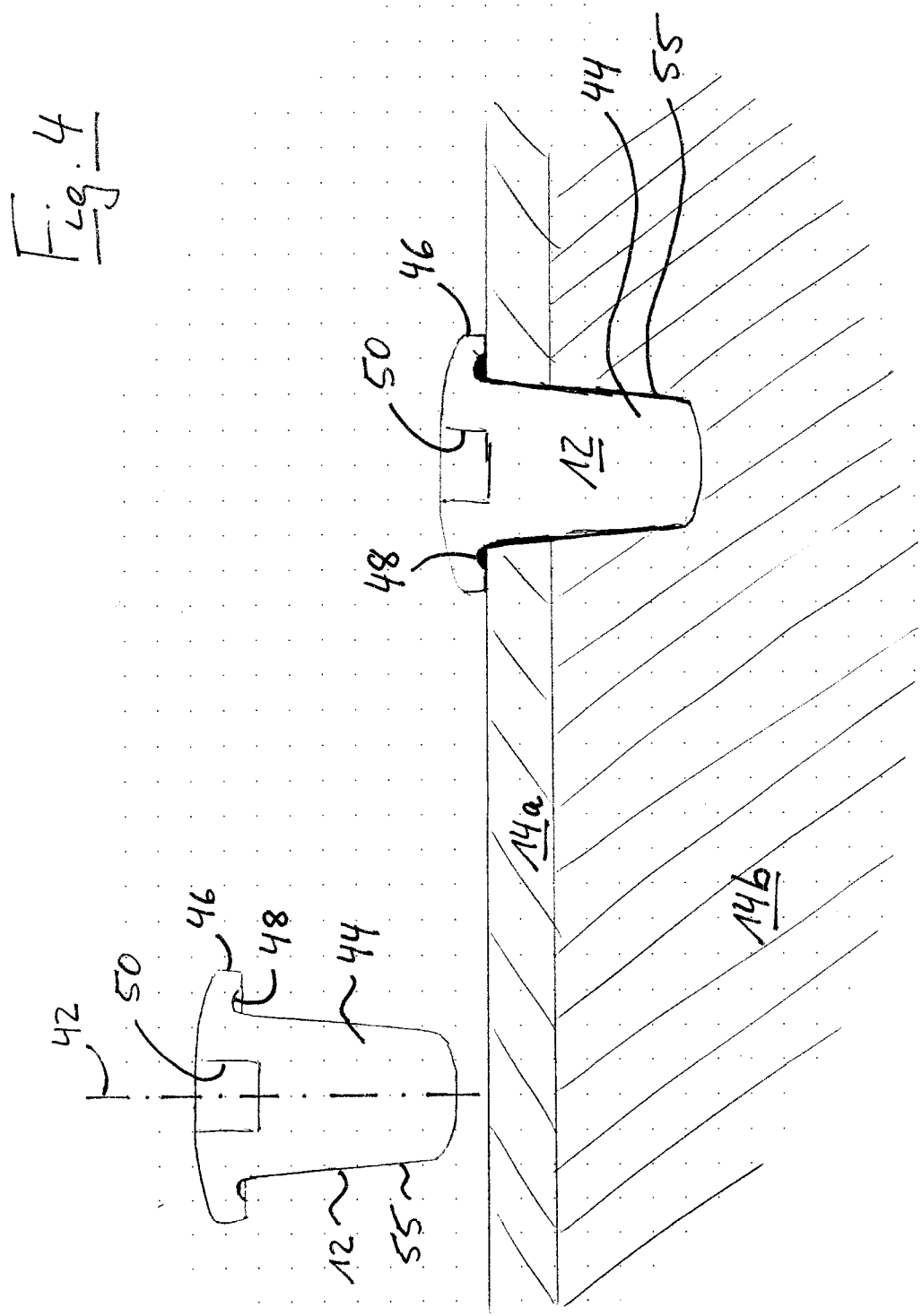

DEVICE FOR SETTING A SETTING ELEMENT IN A COMPONENT

CROSS-REFERENCES TO RELATED APPLICATIONS

This patent application is a 371 of International Application No. PCT/EP2015/057992, filed Apr. 13, 2015 which claims the priority of German Application No. 102014105702.3, filed Apr. 23, 2014 which is incorporated herein by reference in its entirety.

The invention relates to an apparatus for setting a setting element in a component, wherein the apparatus comprises a rotary feed unit by which the setting element can be set into rotation about an axis of rotation and simultaneously an axial force acting in the direction of the axis of rotation can be exerted on the setting element to drive the setting element into the component while producing a friction welding connection between the setting element and the component.

Such apparatus are generally known and are conventionally used for joining metal components, with setting elements of metal being used in this respect.

It is the underlying object of the invention to provide an apparatus which is suitable for setting plastic setting elements in components which e.g. comprise a plastic material.

The object is achieved by an apparatus having the features of claim 1 and in particular in that the apparatus comprises a differential distance measurement device for measuring the differential distance between a surface of the component and a surface of the driven setting element and also comprises a control unit for controlling the rotary feed unit in dependence on the measured differential distance.

The invention is based on the recognition that the surface of the component can be deformed and can in particular be pressed in locally on the setting of a plastic setting element in a plastic component by friction welding due to the heat input occurring during the friction welding. It is, however, indispensable for a correct carrying out of the setting process to know the exact penetration depth of the setting element in the component at every point in time, in particular so that the welding apparatus which are provided for joining metal components in which no significant surface deformation occurs, it is therefore not sufficient only to measure the absolute feed of the rotary feed unit on the setting of plastic setting elements in plastic components or in other components which can be deformed comparatively easily.

The idea in accordance with the invention therefore comprises carrying out a relative measurement, more precisely, determining the feed of the setting element relative to the component. The actual penetration depth of the setting element in the component is also always known in this manner with an e.g. concave deformation of the surface of the component and the setting procedure can be ended at a desired time in dependence on the measured differential distance, for example before melted material of the component and/or of the setting element is displaced from the setting point to the surface of the component in an unwanted manner and becomes visible. The setting of plastic elements in plastic components can consequently be carried out reliably and reproducibly with the aid of the friction welding apparatus in accordance with the invention.

For example, two components can be joined by means of a set setting element, wherein at least the lower component should have a plastic material, for the establishing of a connection having material continuity to the setting element. The upper component can likewise have a plastic material, in which case there is also a connection with material continuity between the setting element and the upper component. It is, however, also conceivable that the upper component is formed from a non-plastic material such as metal, glass or wood. In this case, the upper component should be provided with a prepunched hole through which the setting element can penetrate into the lower component. In the joined state, the upper component is then clamped to the lower component by a head of the setting element contacting said upper component.

In accordance with an alternative application, the setting element is only set into one component. Such a setting element can, for example, serve as a mount for a screw which would otherwise not find any grip in the material of the component, for example because the material of the component forms a honeycomb structure or is a foam material. It is understood that a setting element provided for the reception of a screw can be provided with a corresponding axial bore, possibly even with a threaded bore. The setting element can also form an articulated part which can be plugged or otherwise connected to a setting element which is configured as a corresponding articulated part and which is set in another component.

Advantageous embodiments of the invention can be seen from the dependent claims, from the description and from the drawing.

In accordance with an embodiment which allows a particularly exact determination of the penetration depth into the component, the differential distance measurement device is arranged adjacent to the axis of rotation. It is understood that the differential distance measurement is the more exact, the closer it takes place to the axis of rotation. For setting elements whose maximum width amounts to approximately 1.5 cm, the radial spacing between the axis of rotation and the site of the differential distance measurement should amount, for example, to no more than 3 cm, and should preferably be in the range from 1 cm to 2 cm.

In accordance with a further embodiment, the control unit is adapted so that it controls the rotary feed unit such that, on the reaching of a maximum predefined differential distance, the setting element is rotated before the end of the setting procedure over a predetermined period of time with an axial force and/or with a feed speed reduced to at least approximately zero. This contributes to a particularly reliable friction welding connection and simultaneously prevents melted To be able to set the axial force in a specific manner during a setting procedure, a force measurement device is advantageously provided to measure the axial force exerted on the setting element. In this manner, the rotary feed unit can be regulated by the control unit with the axial force as the control variable. The torque exerted on the setting element as well as the number of revolutions of the setting element per time or the absolute number of revolutions of the setting element can be considered as alternative or additional control variables for regulating the rotary feed unit. It is furthermore conceivable to operate the setting procedure in a plurality of stages, with different control variables being used in at least two stages.

The rotary feed unit preferably has an electric motor feed drive. It has the advantage with respect to pneumatic feed drives used in conventional friction welding apparatus that the feed can be controlled substantially more exactly, which is of great importance for the setting of plastic setting elements.

A particularly simple construction embodiment is additionally achieved when the rotary feed unit also has an electric motor rotary drive.

In accordance with a further embodiment, the apparatus comprises supply means for the automatic supply of setting elements from a setting element store. The supply means can, for example, have a pneumatic supply device which shoot the setting elements fully automatically by means of compressed air from a setting element reservoir which is in particular inexhaustible, but at least refillable, into a supply head of the apparatus which holds the supplied setting elements for the bringing into engagement with the setting tool. The supply means can also comprise a pick & place system instead of a pneumatic supply device.

In accordance with a variant of supply means, the apparatus can comprise a magazine containing a limited number of setting elements. The magazine can be fixedly installed at the apparatus so that it has to be restocked with setting elements from time to time. Alternatively, the magazine can also be replaceably mounted at the apparatus so that it only has to be replaced with a full magazine after consumption of all the setting elements.

A further subject of the invention is a method having the features of claim 11 by which the aforesaid advantages can be correspondingly achieved.

In accordance with an embodiment of the method, the setting element is set into a non-prepunched component. The component can alternatively be prepunched. The component can, for example, be provided with a top layer, e.g. composed of a non-plastic material such as metal, glass or wood, having a prepunched hole and the setting element can be set into the prepunched hole such that it melts behind the top layer and forms an undercut. In this case, the set setting element is therefore so-to-say doubly secured in the component, namely on the one hand, by the connection with material continuity to the plastic material of the component, and on the other hand, by the mechanical anchorage which results from the undercut engaging behind the top layer.

The plastic material of the component can, for example, be fiber-reinforced and/or can form a honeycomb structure and/or can comprise a foam material.

The plastic material of the setting element ideally has a higher melting point than the plastic material of the component so that the setting element can be driven into the component at all and does not already dissolve at its surface.

The invention will be described in the following purely by way of example with reference to possible embodiments and to the enclosed drawing. There are shown:

FIG. 1A a side view of a friction welding apparatus in accordance with the invention;

FIG. 1B a first perspective view of the apparatus of FIG. 1A;

FIG. 1C a second perspective view of the apparatus of FIG. 1A;

FIG. 2 a sectional view of a setting element to be set and set in a first component;

FIG. 3 a sectional view of a setting element to be set and set in a second component; and FIG. 4 a sectional view of a setting element provided for joining two components before and after the setting.

A friction welding apparatus 10 is shown in FIG. 1 which serves for the setting of a setting element 12 comprising a first plastic material in a component 14 comprising a second plastic material, as will be explained in more detail with reference to FIGS. 2 to 4.

The apparatus 10 comprises a carrier plate 16 which is installed as stationary in the present embodiment and has a guide rail 18 which extends in an axial direction and at which a rotary feed unit 20 is supported displaceably in the axial direction. An electric motor feed drive 22 is provided for displacing the rotary feed carrier plate 16 and drives the rotary feed unit 20 via a feed spindle 24. The axial force with which the feed drive 22 moves the rotary feed unit 20 forward is measured with the aid of a force measuring device, not shown, which is integrated in the rotary feed unit 20. The measured axial force is evaluated in a control unit, not shown, of the apparatus 10.

The rotary feed unit 20 furthermore has an electric motor rotary drive 26 by means of which a tool mount 28, and thereby a tool 29 for the setting element 12 received therein (FIGS. 2 to 4), can be rotatingly driven about an axis of rotation 31 extending in the axial direction. The torque applied during a setting process can be derived from the current pick-up of the rotary drive 26. This can likewise be evaluated in the control unit.

A differential distance measuring device 30 is furthermore laterally attached to the rotary feed unit 20 and comprises a sensing hoop 32 which projects over the tool mount 28 viewed in the axial direction in a position of rest shown in FIG. 1. The sensing hoop 32 is curved in the direction of the axis of rotation 31 such that a front end 34 of the sensing hoop has a spacing of approximately 2 cm from the axis of rotation 31. A rear end 36 of the sensing hoop 32 is connected to a guide rod 38 supported displaceably in the axial direction at the rotary feed unit 20. The guide rod 38 is coupled in a section remote from the sensing hoop 32 to a return spring, here in the form of a helical spring 40 surrounding the guide rod 38, against whose return force the sensing hoop 32 is supported at the component 14 can deflect when setting the setting element 12 into the component 14.

A contactlessly readable scale, which is not shown in any more detail, is provided at the guide rod 38, e.g. in the form of a marked magnetic strip which, on the deflection of the sensing hoop 32, moves past a distance sensor 41 installed in a stationary manner relative to the guide rod 38 and suitable for reading the scale to feed unit 20 and the sensing hoop 32, i.e. that is ultimately to display the penetration depth of the setting element 12 in the component 14.

The tool 29 received in the tool mount 28 is stocked with a setting element 12 for a setting procedure. This can generally take place manually. However, a supply device, e.g. a pneumatic supply device, (not shown) is preferably provided for this purpose which shoots the setting element 12 fully automatically into a supply head, likewise not shown, of the apparatus 10 in which the setting element 12 is brought into engagement with the tool 29. Instead of a pneumatic supply device, a pick & place system or a magazine solution is also conceivable for the supply of setting elements 12.

As FIG. 2 shows, the setting element 12 has a rotationally symmetrical design about a longitudinal center axis 42. It comprises a conical base body 44 at whose head end a collar 46 radially projects in whose lower side a peripheral recess 48 is sunk. An engagement feature 50 for the tool 29, for example a hexagonal hole, is provided at the upper side of the setting element 12.

The setting element 12 is produced, e.g. by means of an injection molding process, in one piece from a plastic material which has a higher melting point than the plastic material of the component 14 into which the setting element 12 is to be set. The component 14 shown in FIG. 2 comprises a honeycomb structure 52 from plastic or from a paper-like material which is provided with a top layer 54 of plastic, e.g. of fiber-reinforced plastic.

To set the setting element 12 into the component 14, the setting element 12 in engagement with the tool 29 is pushed forward by the feed drive 22 until it contacts the component 14. The sensing hoop 32, which is likewise supported at the component 14, has already been deflected by a certain distance in this situation and in this position defines a zero point for the differential distance measurement.

The setting element 12 is set into rotation by the rotary drive 26 of the rotary feed unit 20 and is brought to a rotational speed required for the friction welding process. As soon as this has been reached, the setting element 12 is driven by the feed drive 22 into the component 14 while applying a desired axial force, with the jacket surface 55 of the base body 44 of the setting element 12 and the adjacent material of the component 14 melting and entering into a connection with material continuity.

The penetration depth of the setting element 12 in the component 14 is measured by means of the differential distance measuring device 30 during the feed of the rotary feed unit 20. As soon as the setting element 12 has penetrated so deeply into the component 14 that the lower side of the collar 46 comes into contact with the surface of the component 14, the axial force applied to the setting element 12 and/or the feed speed is reduced to zero by stopping the feed drive 22, whereas the rotation of the setting element 12 can still be maintained for a specific time period so that the recess 48 at the lower side of the collar 46 of the setting element 12 can be filled with melted plastic material, but no melted plastic material moves outwardly beyond the collar 46. To end the setting process, the rotary drive 26 is stopped and the tool 29 is released by moving the rotary feed unit 20 back from the setting element 12 and the melted material can cool down. Optionally, a waiting time has to be worked through after the stopping of the rotary drive 26.

An alternative application is shown in FIG. 3 in which a setting element 12 of the above-described type is set into a component 14 which comprises a honeycomb structure 52 of plastic or of a paper-like material and a top layer 54 thereon of a metal material. The top layer 54 is provided with a round prepunched hole 56 so that the setting element 12 can penetrate through it. Alternatively, the prepunched hole 56 can also be non-round, e.g. angled, whereby the set setting element 12 can later receive a higher rotating element, e.g. when a screw is screwed into the setting element 12.

For the setting procedure, the setting element 12 is aligned with the prepunched hole 56 and is driven as described with reference to FIG. 2 into the honeycomb structure 52 of the component 14. With a suitable control of the axial force exerted onto the setting element 12 and of the speed of the setting element 12, the setting procedure can be continued such that the setting element 12 widens below the top layer 54 and in this manner forms an undercut 58 which provides a shape-matched connection of the setting element 12 to the top layer 14 in addition to the connection of the setting element 12 with material continuity with the honeycomb structure 52.

An application example is shown in FIG. 4 in which a setting element 12 of the above-described kind is used for joining two components 14a, 14b. Each component 14a, 14b comprises a plastic material whose melting point is lower than that of the setting element 12. The components 14a, 14b are placed over one another for the joining procedure and the setting element 12 is driven through the upper component 14a in the already described manner into the lower component 14b so that it at least enters into a connection with material continuity with the lower component 14b. The upper component 14a can be provided with a prepunched hole to achieve only a clamping effect with respect to the lower component 14b.

The penetration depth of the setting element 12 is also monitored exactly by the differential distance measuring device 30 here and the axial force exerted onto the setting element 12 on the reaching of the desired penetration depth, namely when the lower side of the collar 46 of the setting element 12 comes into contact with the surface of the upper component 14a, is reduced to zero by stopping the feed drive 22, while the setting element 12 is still rotated further for a specific time period.

It must finally be noted that the apparatus 10, in contrast to what is shown in FIG. 1, does not necessarily have to be mounted in a stationary manner. It is by all means conceivable also to install the apparatus 10 in a movable manner, for example in a multiaxial machining station or at a robot arm. It is of advantage in this respect that much lower axial forces are sufficient for the setting of plastic setting elements 12 in plastic components 14 than in the friction welding of metal components so that the setting processes carried out with the apparatus 10 can generally be carried out without a counter-bearing of the component 14 with a sufficient stiffness of the component 14.

REFERENCE NUMERAL LIST 10 apparatus
12 setting element
14 component
16 support plate
18 guide rail
20 rotary feed unit
22 feed unit
24 feed spindle
26 rotary drive
28 tool mount
29 tool
30 differential distance measuring device
31 axis of rotation
32 sensing hoop
34 front end
36 rear end
38 guide rod
40 helical compression spring
41 distance sensor
42 longitudinal central axis
44 base body
46 collar
48 recess
50 engagement feature
52 honeycomb structure
54 top layer
55 jacket surface
56 prepunched hole
58 undercut

The invention claimed is:

1. An apparatus for setting a setting element comprising a first plastic material in a component comprising a second plastic material, the apparatus comprising:
   a rotary feed unit by which the setting element can be set into rotation about an axis of rotation and simultaneously an axial force acting in the direction of the axis of rotation can be exerted onto the setting element to drive the setting element into the component while producing a friction welding connection between the setting element and the component;
   a differential distance measuring device for measuring a differential distance between a surface of the component and a surface of the driven setting element; and a control unit for controlling the rotary feed unit in dependence on the measured differential distance, wherein the control unit is configured to control the rotary feed unit such that on reaching a predefined differential distance, representing a maximum penetration depth of the setting element in the component comprising the second plastic material, the setting element is rotated before the end of a setting procedure over a predetermined period of time with an axial force reduced to approximately zero.

2. The apparatus in accordance with claim 1,
wherein the differential distance measuring device is arranged adjacent to the axis of rotation.

3. The apparatus in accordance with claim 1,
wherein the control unit is adapted so that it controls the rotary feed unit such that, on reaching the maximum predefined differential distance, the setting element is rotated before the end of the setting procedure over the predetermined period of time with a feed speed reduced to approximately zero.

4. The apparatus in accordance with claim 1,
further comprising a force measuring device for measuring the axial force exerted onto the setting element.

5. The apparatus in accordance with claim 4,
wherein the rotary feed unit can be regulated by the control unit, with an axial force exerted onto the setting element; a torque exerted on the setting element; a number of revolutions of the setting element per time; and/or an absolute number of revolutions of the setting element as a control variable.

6. The apparatus in accordance with claim 1,
wherein the control unit is adapted such that it divides a setting procedure into a plurality of stages and regulates the rotary feed unit in at least two stages with different control variables.

7. The apparatus in accordance with claim 1,
wherein the rotary feed unit has an electric motor feed drive.

8. The apparatus in accordance with claim 1,
wherein the rotary feed unit has an electric motor rotary drive.

9. The apparatus in accordance with claim 1,
further comprising supply means for the automatic supply of setting elements from a setting element store.

10. The apparatus in accordance with claim 9,
wherein the supply means comprises one of a pneumatic supply device, a pick & place system and a magazine containing a number of setting elements.

11. The apparatus in accordance with claim 10,
wherein, if the supply means comprises the magazine, then the magazine is an exchangeable magazine containing a number of setting elements.

* * * * *